United States Patent [19]

Cantrell

[11] 3,927,391

[45] Dec. 16, 1975

[54] TECHNIQUE FOR RANKING DATA OBSERVATIONS

[75] Inventor: Ben H. Cantrell, Oxon Hill, Md.

[73] Assignee: The United States of America as represented by the Secretary of the Navy, Washington, D.C.

[22] Filed: Mar. 25, 1975

[21] Appl. No.: 561,966

[52] U.S. Cl. .............................. 340/146.2; 235/177

[51] Int. Cl.[2] .............................. G06F 7/02

[58] Field of Search ..... 340/146.2; 235/177, 92 SH, 235/92 CA

[56] References Cited

UNITED STATES PATENTS

| | | | |
|---|---|---|---|
| 3,794,974 | 2/1974 | Henn et al. | 340/146.2 |
| 3,829,664 | 8/1974 | Kashio | 340/146.2 |

*Primary Examiner*—Joseph F. Ruggiero
*Assistant Examiner*—Errol A. Krass
*Attorney, Agent, or Firm*—R. S. Sciascia; Arthur L. Branning

[57] ABSTRACT

An improved technique for rapidly computing the real time rank of all data observations in a plurality of data sets. A plurality of *n* numbers, each representing a particular data observation, are sequentially entered into a plurality of serially connected storage registers. As each new observation is entered, it is compared with the previous observation to determine its magnitude relative to each other observation of the data set. The magnitudes, represented by a binary digit, are stored and synchronized by clock and delay circuitry to increment or decrement a value in a rank register for each of *n* data observations. After *n* data observations have been serially entered to form a data set, each serial entry of a new data observation forms a new data set which is automatically ranked using the redundancy information from the previously ranked data sets.

10 Claims, 1 Drawing Figure

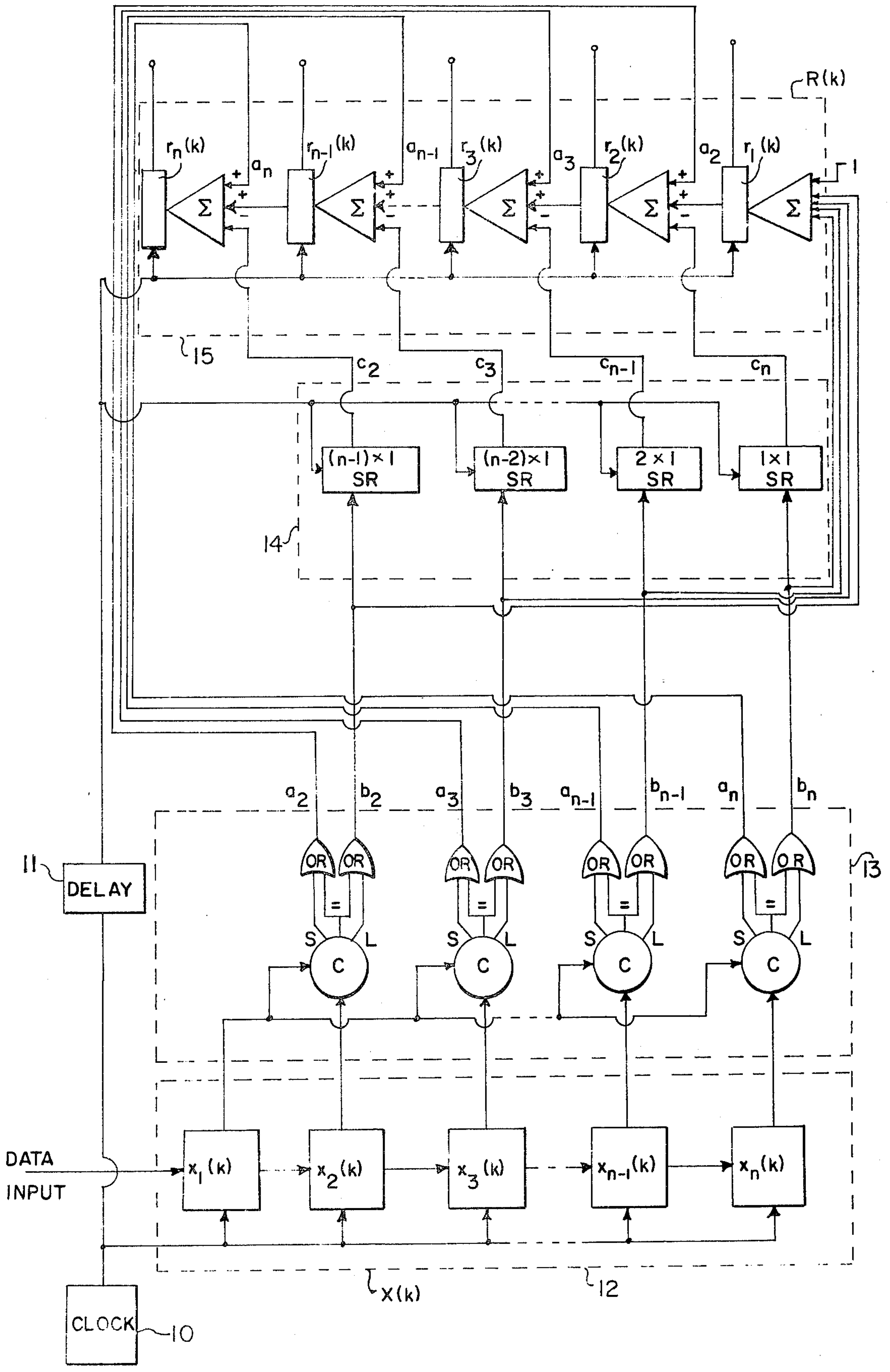
R(k)
$r_n(k)$
$r_{n-1}(k)$
$r_3(k)$
$r_2(k)$
$r_1(k)$
$a_n$
$a_{n-1}$
$a_3$
$a_2$
1
15
$c_2$
$c_3$
$c_{n-1}$
$c_n$
(n-1)×1 SR
(n-2)×1 SR
2×1 SR
1×1 SR
14
$a_2$ $b_2$ $a_3$ $b_3$ $a_{n-1}$ $b_{n-1}$ $a_n$ $b_n$
OR
S
L
C
13
11
DELAY
DATA INPUT
$x_1(k)$
$x_2(k)$
$x_3(k)$
$x_{n-1}(k)$
$x_n(k)$
X(k)
12
CLOCK
10

TECHNIQUE FOR RANKING DATA OBSERVATIONS

BACKGROUND OF THE INVENTION

The present invention relates to an improved technique for ranking a sequence of numbers representing data observations and more particularly to a system and technique for computing the rank of all sets of numbers of length n of a long sequence of numbers.

In some prior known techniques data merging systems have been designed to operate on a plurality of data observations, represented in digital or analog form, to produce an ordered output from a given sequence of inputs. While such systems could provide ascending or descending order for a plurality of data observations, the same have usually been complex and extremely expensive to implement, and incapable of operating in a real time environment for large sets of numbers or observations.

In a specific application to radar systems, the rank or order of a data set is particularly significant in allowing an increase in the effectiveness of the system under particular operational and environmental conditions. One such technique, as described in an article entitled "Detection Performance of Some Nonparametric Rank Tests and an Application to Radar" by V. G. Hansen, IEEE Transactions, IT-16, No. 3, May 1970, pp. 309–318, utilizes the Spearman rho test to increase the probability of target detection. If it is assumed, for example, that a single set of radar observations, based on interference only, are statistically independent, than for a set of observations including both a target signal and interference, the observations will be influenced by the target signal of different amplitude for each observation, and result in a trend or rank order of the received set of observations. In a scanning search radar system employing the Spearman rho detector, the set of observations $[X(k)] = [x_1(k), x_2(k), x_3(k) \ldots x_n(k)]$ over the last $n$ pulse transmissions are stored at a given range cell after the $k^{th}$ pulse transmission where $k = 1, 2, 3 \ldots$. The rank of the observations can then be specified by the vector of ranks $[R(k)] = [r_1(k), r_2(k) \ldots r_n(k)]$ where $r_i(k)$ is the rank of the observation $x_i(k)$ for $i = 1, 2, 3 \ldots n$. The rank vector is then used in the Spearman rho test to compute the test statistic $$T(k) = \sum_{i=1}^{n} (n-i)r_i(k)$$

at each range cell after each new pulse transmission $k$.

As can be seen from the above referenced article, the success of the Spearman rho technique depends on the determination of rank for various sets of radar data observations. In the same manner, other techniques and devices designed to eliminate target suppression in adaptive threshold detectors, also depend on the determination of rank for various sets of data observations. In such prior art techniques, the effectiveness of the systems have been substantially limited by the inability to rapidly compute, on a continuing basis, the ranks of all sets of data observations in real time for all values of $k$ and specifically for sequential values of $k = 1, 2, 3 \ldots$. While computer techniques have been proposed to digitally process numbers representing the data observations, the same determine rank for $[X(k)]$ for each new value of $k$ without reference to the rank information already computed. Such techniques require large amounts of digital storage or memory, prohibit the computation of real time rank, and increase the cost to a point where the benefits are insufficient to justify the use of the techniques utilizing the rank information.

Accordingly, the present invention has been developed to overcome the shortcomings of the above known and similar techniques and to provide an improved technique for computing the rank of all data sets using the redundancy of the ranking procedure.

SUMMARY OF THE INVENTION

It is therefore an object of the present invention to provide an improved technique and system for ranking numbers that is simple to implement yet highly reliable in operation.

Another object of the invention is to provide a ranking system that can compute the ranks of all sets of numbers of length n for a long sequence of numbers.

Still another object of the invention is to provide a ranking technique and system that utilizes less circuitry and operates at increased speeds utilizing the redundancy of rank information.

A further object of the invention is to provide a technique and system for computing the rank of a data set for each new data observation.

Yet another object of the invention is to provide a digital technique and system for providing real time rank utilizing conventional circuitry.

In order to accomplish these and other objects, the invention employs a series of storage registers to sequentially store and shift each data observation forming a vector of data observations $[X(k)]$. Under the control of a clock, each new observation is entered into the bank of storage registers and compared to all other values previously entered to determine its rank position relative to the other observations of the data set. The comparison is made using a bank of comparators which output binary 1's and 0's at "smaller than" or "larger than" terminals depending on whether the new observation is smaller or larger than each of the observations to which it is compared. In this manner, each new observation is updated along with all other observations of the data set. The "larger than" output terminal of each comparator is coupled to a delay register and a summing circuit to provide signals for decrementing a rank register of any observation of the data set which is smaller than the new observation. In a like manner, each "smaller than" output is coupled to a summing circuit associated with each rank register to increment the rank of any observation that is greater than the new observation. By delaying the clock signal, storage in the delay and rank registers can be delayed until the comparison of each new observation has been made, thereby providing updated rank output for each new data set formed by a new data observation. The ranked output is provided by each rank register which corresponds to a data observation in the input storage register. Since each new observation is ranked as it is entered and the rank of all other observations are altered at the same time, the system provides real time computation of rank for any number of observations in a data set. In addition, since each new observation is updated continuously, based on the redundancy of prior computed ranks, storage space is minimized, and increased speed is realized.

Other objects, advantages, and novel features of the invention will become apparent from the following detailed description of the invention when considered with the accompanying drawing wherein:

BRIEF DESCRIPTION OF THE DRAWINGS

The drawing shows a schematic diagram of the ranking system according to the present invention.

DETAILED DESCRIPTION OF A PREFERRED EMBODIMENT

Referring to the drawing, a schematic diagram is shown which represents an improved system and technique for obtaining the rank of series of numbers representing data observations which form data sets according to the present invention. In the present example, the data observations are represented by a series of digital numbers which may be radar observations or signals from any source where the rank of each observation in a data set must be determined. As shown in the drawing, the individual numbers representing the data observations are read from the data input into the storage register 12 under the control of clock 10. The storage register 12 is composed of a series of individual storage circuits $x_1(k)$, $x_2(k)$ . . . $x_n(k)$ which form the data set $[X(k)]$ of length $n$. Each of the individual storage circuits is constructed to read and store a number value at its input for each clock pulse delivered by the clock 10. The stored value is then available at the storage circuit output until the next clock pulse is received. The storage circuits may be constructed from any well known storage devices such as flip-flops which are connected to act as a shift register in response to the clock 10. Thus, in response to a first clock pulse, a digital number is entered into the storage circuit $x_1(k)$ and available as output to $x_2(k)$ and to a comparator bank 13. On the next succeeding pulse, the number stored in $x_1(k)$ is read and stored by $x_2(k)$ and a new observation read and stored in $x_1(k)$. In a like manner, on each succeeding clock pulse, a new observation is read into $x_1(k)$, and the previous observations sequentially shifted to $x_2(k)$, $x_3(k)$ . . . $x_n(k)$, while each output is also available to the comparator bank 13.

Comparator bank 13 is formed from a plurality of digital comparison circuits C of any conventional construction designed to have two inputs and to provide outputs indicating when one of the inputs is smaller than (S), larger than (L), or equal to (=) the other input. The bank 13 is comprised of $(n-1)$ comparators with each comparator having one input from the $x_1(k)$ storage circuit output, and the other input from one of remaining $x_2(k)$, $x_3(k)$ . . . $x_n(k)$ storage circuit outputs as shown in the drawing. Each comparator is designed to provide a binary 1 at the L output when the $x_1(k)$ output is larger than the other input to the comparator and, simultaneously, binary 0's at the S and = outputs of those comparators. Likewise, when the $x_1(k)$ output is smaller than the other input to a comparator, a binary 1 will appear at the S output to that comparator and, simultaneously, binary 0's at the remaining L and = outputs. In the same manner, when any two inputs to a comparator are equal, a binary 1 will be provided at the = output, and binary 0's at the S and L outputs. The S and L outputs are then coupled to individual or-gates along with the = output to produce the plural signal outputs $a_2, a_3 \ldots a_n$ and $b_2, b_3 \ldots b_n$ from the comparator bank 13.

Each of the $b$ outputs from bank 13 is coupled as input to a delay register 14 and a rank register 15. The delay register 14 is composed of a plurality $(n-1)$ of one-bit shift registers SR of progressively decreasing bit lengths. Each shift register SR may be, for example, a plurality of serially connected flip-flops coupled to read and store the b output (a binary 1 or 0) in a first flip-flop in response to the delayed clock pulse from delay 11, and shift the bit to the next successive flip-flop for each succeeding clock pulse. The $b_2$ output would therefore be coupled to a shift register having $n-1$ flip-flops such that after $n-1$ clock pulses the first read $b_2$ output would appear at the $c_2$ output of delay register 14, and on each succeeding clock pulse from delay 11, the next succeeding $b_2$ output would be provided in serial order. As was noted, each of the shift registers progressively decreases in length with the shift register coupled to the $b_n$ output consisting of a single flip-flop which reads and stores the new $b_n$ output for each clock pulse from delay 11, and provides that same output at $c_n$ on the same clock pulse. In order for the delay registers to store the proper digital values for each clock pulse, it is important that the delay 11 delays each clock pulse from 10 for a time sufficient to allow the comparisons to be made in comparator bank 13 to provide the new a and b outputs after each clock pulse from 10.

The rank register 15 is composed of a plurality of storage registers $r_1(k)$, $r_2(k)$, $r_3(k)$ . . . $r_n(k)$ forming the data set of $[R(k)]$. Each of the storage registers receives an input from a summing circuit which is read and stored in response to the delayed clock pulses from delay 11. At the input to the storage register $r_1(k)$, a summing circuit receives each of the $b_2, b_3 \ldots b_n$ inputs and sums those values with a fixed binary one to give a number rank. For example, if all the $b$ outputs are binary 1's, the total sum read into the $r_1(k)$ register will be the number $n$. The output from the $r_1(k)$ storage register is then coupled to the $r_2(k)$ summing circuit where it is summed with the $a_2$ output from the comparator bank 13. At the same time, the $c_n$ output is subtracted from the sum of $r_1(k)$ and $a_2$ to provide input to the $r_2(k)$ storage register. In a similar manner, each of the storage register outputs is combined with the designated $a$ output and $c$ output in the next succeeding summing circuit to provide the proper sum to the next succeeding storage register up to $r_n(k)$. The outputs from each storage register $r_1(k)$, $r_2(k)$ . . . $r_n(k)$, after each clock pulse from delay 11, then represent the rank of each of the corresponding data observations $x_1(k)$, $x_2(k)$ . . . $x_n(k)$ for the data set $[X(k)]$ with the number from $r_i(k)$ representing the rank of the data observations $x_i(k)$ for all values of $i = 1, 2 \ldots n$. As noted in regard to the delay registers 14, the clock pulse from 10 is delayed by 11 so that the values from the $a$, $b$, and $c$ outputs can be combined in each of the summing circuits in the manner described before the sum is read into the storage registers $r_1(k)$, $r_2(k)$ . . . $r_n(k)$.

The operation of the system will now be described with particular reference to a specific example. Assume it is desired to rank a long sequence of numbers generally represented as ——, ——, ——, 22, 27, 9, 21, 12, 10. If a vector of data observations is defined as $[X(k)]$ then $[X(k)] = [x_1(k), x_2(k) \ldots x_n(k)]$ for $k = 1, 2, 3 \ldots$ where the length of each data set is $n$. The rank information is then specified by a vector of ranks $[R(k)]$ where $[R(k)] = [r_1(k), r_2(k) \ldots r_n(k)]$ and $r_i(k)$ is the rank of the observation $x_i(k)$ for all values of $i = 1, 2, 3 \ldots n$. By way of example, if $[X(k)] = [3, 5, 9, 1]$ then $[R(k)] = [2, 3, 4, 1]$.

In the present example, it is desired to determine $[R(k)]$ for all values of $k$ and more specifically for sequential values of $k = 1, 2, 3 \ldots$ where the length $n$ of each data set is $n$=4. After initializing the ranking system by placing zeros in all storage locations, clock pulses representing $k$ increments are periodically generated by the clock 10. On the first clock pulse (or $k$=1) the first number of the sequence (10) is read and stored in the storage circuit $x_1(1)$ and compared with the remaining storage circuit outputs $x_2(1)$, $x_3(1)$, and $x_4(1)$ which were initially set at zero. A binary 1 will appear at each of the $b_2$, $b_3$, and $b_4$ outputs indicating that the number 10 is greater than the zeros in the other storage circuits. At the same time a zero will be provided at each of the $a_2$, $a_3$, and $a_4$ outputs since the S and = outputs are zero. After a time fixed by delay 11, the first clock pulse will cause each of the shift registers in 14 to read and store the b value (in this case all binary 1's), and cause each of the storage registers $r_1(k)$, $r_2(k)$, $r_3(k)$, and $r_4(k)$ to store the number provided at its input by its associated summing circuit output. In the present example, after the first clock pulse, the $a_2$, $a_3$, and $a_4$ inputs to the summing circuit will be zero and each of the outputs $c_2$, $c_3$, and $c_4$ will be zero prior to the receipt of the delayed clock pulse from 11. Since the $r_1(1)$, $r_2(1)$, $r_3(1)$, and $r_4(1)$ registers are also initially zero, zeros will be read and stored in $r_2(1)$, $r_3(1)$, and $r_4(1)$ after the first delayed clock pulse is received by the rank registers 15. The $r_1(1)$ register, however, will read and store the output of its summing circuit having four binary 1's as input from the fixed 1 and the outputs $b_2(1)$, $b_3(1)$, and $b_4(1)$. The rank of $x_1(1)$ after the first clock pulse will therefore be 4. On the next succeeding clock pulse ($k$=2), the number 12 will be read into the first storage circuit $x_1(2)$ and the number 10 shifted to the second storage circuit to make $x_1(2) = 12$ and $x_2(2) = 10$ while $x_3(2)$ and $x_4(2)$ remain zero. The number 12 at $x_1(2)$ is compared to the number 10 at $x_2(2)$ and the zeros at $x_3(2)$ and $x_4(2)$ in the comparators 13 to give binary 1's at the outputs of $b_2$, $b_3$, and $b_4$ and binary 0's at the outputs of $a_2$, $a_3$, and $a_4$. At this same time, the $c_4$ output is also 1, as stored from the previous clock pulse, and is subtracted in the $r_2(2)$ summing circuit from the number (4) at the output of $r_1(2)$ prior to reception of the delayed second clock pulse from delay 11. Upon reception of the delayed second clock pulse from delay 11, the $b_2$, $b_3$, and $b_4$ outputs are again read and stored by the delay registers 13 and the sum +1 stored in the $r_1(2)$ storage register to give a rank of 4. The sum stored by the $r_2(2)$ storage register on the same second delayed clock pulse is 4−1 to give $r_2(2)$ a stored rank of $r_2(2)$= 3 after the second clock pulse. Utilizing the same analysis, the outputs of the rank register after the third succeeding pulse will give a rank of $r_1(3) = 4$, $r_2(3) = 3$, and $r_3(3) = 2$, and after the fourth succeeding pulse, $r_1(4) = 1$, $r_2(4) = 4$, $r_3(4) = 3$, and $r_4(4) = 2$. Thereafter, each successive clock pulse representing an incremented value of $k$ will cause the circuit to compute and indicate a new rank for each observation at the output of the rank register 15 after the delay set by pulse delay 11. As can be seen, after $n$ clock pulses, the vector of ranks $[R(k)]$ yields the rank of $[X(k)]$. In operation, if any two numbers are of the same value, the same procedure will result in the data observation being given the same rank. In the number sequence of the given example, the data sets forming the vector $[X(k)]$ for each value of $k = 1, 2, 3 \ldots$ would be represented as $$[X(1)] = [10,0,0,0]$$
$$[X(2)] = [12,10,0,0]$$
$$[X(3)] = [21,12,10,0]$$
$$[X(4)] = [9,21,12,10]$$
$$[X(5)] = [27,9,21,12]$$
$$\downarrow \qquad \downarrow$$

while the rank of each set representing the rank vector $[R(k)]$ would be $$[R(1)] = [4,0,0,0]$$
$$[R(2)] = [4,3,0,0]$$
$$[R(3)] = [4,3,2,0]$$
$$[R(4)] = [1,4,3,2]$$
$$[R(5)] = [4,1,3,2]$$
$$\downarrow \qquad \downarrow$$

These ranks can then be used in the Spearman rho test when the data observations are radar returns, or used in any other technique requiring such rank information.

As can be seen from the above description, the present invention provides a simple system for computing the rank of all sets of numbers in a long sequence of numbers using only conventional circuitry connected in a unique manner to utilize the redundancy information in rank determination. Using only simple storage and comparator circuits, the rank of each new data observation is computed as it is entered into the system to give a real time indication of the rank of each new data set as it is formed. Since rank is computed on a continuing basis using only single bit binary values, rather than by reworking complete data sets, reduced storage space is required and increased computing time is obtained. In addition, since conventional digital circuitry can be used, the system is simple to construct yet highly reliable in operation. All of these are advantages not found in prior techniques as previously mentioned.

While the invention has been described with particular reference to a data set of length $n$=4, it is apparent from the description that the data set could be of any desired length by increasing the number of storage registers 12, comparators 13, delay registers 14, and rank registers 15 in the manner as taught by the disclosure.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An apparatus for computing the rank of each data observation in sets of data using the redundancy of rank information comprising:

control means for providing first and second control signals;

data means responsive to said first control signal for sequentially reading and storing a series of data observations;

first means coupled to said data means for providing an indication of the magnitude of each new data observation relative to previously stored data observations of said series;

second means coupled to said providing means and responsive to said second control signal for storing said magnitude indications and providing delayed outputs; and rank means coupled to said first means and to said second means and responsive to said second control signal for summing said magnitude indications from said first means and said delayed outputs from said second means to provide a rank for all stored data observations after each new data observation is read.

2. The apparatus of claim 1 wherein said rank means comprises; a plurality of summing circuits each having plural inputs and an output, and a plurality of rank storage circuits each responsive to said second control signal for storing the output of one of said summing circuits representing the new rank of a data observation, each of said rank storage registers being coupled to provide its stored output as one input to a different one of said summing circuits to form a series of alternately coupled summing circuits and rank storage registers, and each of said delayed outputs and magnitude indications being coupled to others of said plural inputs to said summing circuits.

3. The apparatus of claim 2 wherein said second means comprises a plurality of delay registers each responsive to said second control signal for storing one of said magnitude indications at an input and providing that indication as one of said delayed outputs after a predetermined delay.

4. The apparatus of claim 3 wherein said first means comprises; a plurality of comparator means for comparing the magnitude of a data observation at a first input with the magnitude of a data observation at a second input and providing outputs indicating when said first input is smaller than, equal to, or greater than said second input, first output means coupled to each comparator means for providing one of said magnitude indications when said first input is greater than or equal to said second input, and second output means coupled to each comparator means for providing one of said magnitude indications when said first input is smaller than or equal to said second input, said first input of each comparator means being coupled to simultaneously receive each new data observation and said second input of each comparator means being coupled to receive a sequential one of said previously stored data observations.

5. The apparatus of claim 4 wherein said control means comprises; a clock means for providing a series of periodic clock pulses forming said first control signal, and delay means coupled to said clock means for providing a delayed pulse for each clock pulse to form said second control signal, and further wherein said data means comprises; a plurality of individual serially connected storage circuits coupled to read and store a new data observation in a first of said storage circuits in response to each clock pulse and sequentially read and store the data observation from a preceeding storage circuit into the next succeeding storage circuit in response to each clock pulse.

6. The apparatus of claim 5 wherein each first output means comprises an or-gate coupled to provide a binary 1 as said magnitude indication when said first input is greater than or equal to said second input and a binary 0 at all other times, and wherein each second output means comprises an or-gate coupled to provide a binary 1 as said magnitude indication when said first input is smaller than or equal to said second input and a binary 0 at all other times.

7. The apparatus of claim 6 wherein each of said delay registers comprises a shift register coupled to receive a magnitude indication from one of said first output means in response to each of said delayed pulses and store said magnitude indication for a predetermined number of delay pulses.

8. The apparatus of claim 7 wherein the magnitude indication from each of said first output means is coupled as one of said plural inputs to a first summing circuit of the rank means and further including, means coupling a binary 1 at all times as input to said first summing circuit.

9. The apparatus of claim 8 wherein said data means comprises n storage circuits, said second means comprises $n-1$ shift registers each having a different storage time sequentially from 1 to $n-1$ delay pulses, and said rank means comprises n rank storage registers and n summing circuits with the delayed output from the one delay pulse shift register being coupled as a negative input to the second summing circuit of the series of summing circuits and the delayed output of each next sequential shift register being coupled as the negative input to the next sequential summing circuit up to the $n^{th}$ summing circuit receiving the delayed output from the $n-1$ delay pulse shift register.

10. The apparatus of claim 9 wherein said first means comprises $n-1$ comparator means, said second output means, coupled to the comparator means comparing said new data observation with the next previously stored data observation, being coupled to provide its magnitude indication as one of said plural inputs to the second summing circuit, and each of the next succeeding second output means being coupled to provide its magnitude indication to the next succeeding summing circuit up to the $n^{th}$ summing circuit, and said first output means, coupled to the comparator means comparing said new data observation with the next previously stored data observation, being coupled to provide its magnitude indication to the $n-1$ delay pulse shift register, and each of the next succeeding first output means being coupled to provide its magnitude indication to the next succeeding shift register decreased by one delay pulse down to the one delay pulse shift register.

* * * * *